United States Patent
Fekete et al.

[15] 3,650,688
[45] Mar. 21, 1972

[54] INDUSTRIAL PROCESS FOR SEPARATION OF NICKEL

[72] Inventors: László Fekete, Imre Pataricza, Dezsö Bodi, Jozsef Gyuricza, Mihály Miskei, and Ferenc Ország, Budapest, Hungary

[73] Assignees: Metalimpex Acel Es Femkulkereskedelmi Vallalat; Femipari Kutato Intezet, Budapest, Hungary

[22] Filed: Oct. 17, 1969

[21] Appl. No.: 867,400

[30] Foreign Application Priority Data

Oct. 23, 1968 Hungary ...................ME-990

[52] U.S. Cl. ...................23/117, 23/50 BE, 23/87 R, 23/154
[51] Int. Cl. ...................C01g 53/10, C01g 53/08, C01b 7/08
[58] Field of Search ...................23/117, 154, 50 SO, 50 BE, 23/87 R

[56] References Cited

UNITED STATES PATENTS

| | | | |
|---|---|---|---|
| 940,293 | 11/1909 | Wells | 23/154 |
| 1,039,861 | 10/1912 | Wells | 23/117 |
| 1,628,829 | 5/1927 | Drefahl | 23/154 X |
| 1,906,467 | 5/1933 | Heath | 23/154 |
| 3,488,185 | 1/1970 | Oberhofer | 23/50 X |

OTHER PUBLICATIONS

" Ion Exchange Resins" by Robert Kunin, 1958 Ed., p. 274–277, John Wiley & Sons, Inc., New York " Ion Exchange Technology" by F. C. Nachod and J. Schubert, 1956 Ed., p. 412, Academic Press Inc., New York

*Primary Examiner*—Edward Stern
*Attorney*—Young & Thompson

[57] ABSTRACT

Nickel can be separated from metals forming chlorocomplex anions, such as cobalt, by dissolving a nickel concentrate in hydrochloric acid, boiling down the nickel chloride solution to a nickel content of not more than 240 grams per liter, increasing the concentration of hydrochloric acid to 7 to 9 moles/liter by adding concentrated sulfuric acid to the solution in an amount equivalent to the nickel present, thereby forming a nickel sulfate salt, adsorbing the metallic contaminations on an anion exchange resin, and isolating hydrated nickel sulfate and hydrochloric acid from the effluent from the resin.

3 Claims, No Drawings

INDUSTRIAL PROCESS FOR SEPARATION OF NICKEL

This invention relates to a continuous industrial process for separation of nickel from chlorocomplex forming metals, especially from cobalt.

The hitherto known processes for industrial working up of cobalt-containing nickel concentrates, including separation of nickel and cobalt from each other, as well as from the accompanying contaminations require multi-step operations, accordingly the preparation of products possessing the commercially required purity is very expensive.

According to a known analytical process (Konrad Dorfner: Ionenaustausch - Chromatographie; Akademie Verlag Berlin, 1963 p. 130–136) nickel, which does not form chlorocomplex anion, can be separated in a single-step process in a strong hydrochloric acidic medium from cobalt, iron, copper, zinc, cadmium and all the other elements which are present in the solution as their chlorocomplex anions by using an anion exchange resin. The complex anions remain bonded on the resin, and pure, nickel-containing solution leaves the column. The cobalt can be carried on the resin only from a hydrochloric acid solution of HCl content higher than 5 moles, and its distribution quotient reaches the maximum in a 9 M HCl Taking into consideration that the adsorption of the other metallic contaminations on the resin is strong enough also from dilute HCl solutions, the cobalt, previously carried on to the resin from the more concentrated solution can be selectively eluted with 3 to 4 M HCl 1 solutions.

The above process gives good results in chemical analyses, however, it cannot be applied in industrial processes because the ion-exchange separation can be carried out only using very dilute nickel-containing solutions.

The nickel content of the solution which forms when dissolving the nickel concentrate in hydrochloric acid, depends on the quantity and concentration of the acid solvent. The most concentrated acid which can be used from industrial points of view is the 30 percent technical hydrochloric acid. In order to ensure a proper dissolution rate, the acid is to be used in a slight excess.

If the nickel concentrate is dissolved in concentrated technical hydrochloric acid to give final solution of 100 to 110 g./l. free HCl content, this solution contains 160 to 170 g./l. of nickel. In order to purify this solution according to the known ion-exchange process, first of all the free hydrochloric acid content of the solution is to be increased e.g. by adding concentrated hydrochloric acid solution to the system. Together with the concentrated technical hydrochloric acid a substantial quantity of water is added, consequently the increase of the HCl concentration is coupled with the decrease of the nickel concentration of the solution.

In the following table there is shown the degree of the change of concentration as a function of the quantity of the concentrated hydrochloric acid to be given to one liter of the starting solution. In this case the required HCl concentration can be reached only by about a ten-fold lowering of the nickel concentration.

TABLE 1

| l. of cc. HCl l. of starting solution | 0 | 1 | 2 | 3 | 4 | 5 | 10 |
|---|---|---|---|---|---|---|---|
| moles of HCl l. of mixture | 3 | 6.24 | 7.3 | 7.84 | 8.16 | 8.37 | 8.87 |
| g. of nickel/ l. of mixture | 167.0 | 83.5 | 55.6 | 41.8 | 33.4 | 27.8 | 15.2 |

The low nickel concentration of the solution used in the ion-exchange separation is, however, not only the consequence of the diluting action of the introduced concentrated hydrochloric acid solution.

If the HCl concentration of the starting solution is increased to 9 moles/liter by introducing dry gaseous hydrochloric acid, the volume of the solution remains essentially unchanged, but, as a consequence of the salting-out action of HCl, $NiCl_2 \cdot 4H_2O$ crystals separate from the solution, accordingly, the mother liquor contains only 20 to 25 g./l. of nickel even in this case.

On the basis of the foregoing, the purification of concentrated nickel-containing solutions by ion-exchange does not seem to be realizable, on the other hand, the working up of dilute solutions makes the process uneconomical from an industrial point of view.

Now we have found that nickel can be separated economically from chlorocomplex anion forming metals in industrial quantities, when the hydrochloric acid concentration of the solution obtained by treating the nickel concentrate with concentrated hydrochloric acid solution is increased to 7 to 9 moles/liter, by adding concentrated sulfuric acid in an amount equivalent to the nickel concentration of the solution, instead of adding concentrated hydrochloric acid solution to the system. Together with the concentrated sulfuric acid only a negligible quantity of water is added, accordingly the decrease of the nickel salt concentration of the solution is insignificant. By the action of sulfuric acid, the nickel chloride originally present is converted to nickel sulfate.

Accordingly, the salting-out effect of the hydrochloric acid does not prevail, moreover the solubility of nickel sulfate is better in a HCl solution of 6 to 9 M, than in pure water. A further, unexpected advantage of the use of concentrated sulfuric acid is, that the liberated chloride anions promote the chlorocomplex anion formation of the metallic contaminations, so the degree of separation increases.

The obtained nickel salt containing solution is passed over an anion exchange resin column. Nickel sulfate leaves the column unchanged, while the chlorocomplex anions of the metallic contaminations (Co, Fe, Cu, Zn, etc.) remain adsorbed on the resin.

When working up the nickel salt containing concentrated hydrochloric acid solution, separated from the metallic contaminations originally present, pure nickel salt can be separated, and a concentrated hydrochloric acid solution can be distilled out.

A further advantage of the process of the invention is, that it makes possible simultaneously the working up of waste hydrochloric acid solutions containing less than 20 percent of hydrochloric acid to a valuable concentrated hydrochloric acid solution. Up to now the working up of such waste hydrochloric acid solutions has been a great problem. Dissolving the nickel concentrate in the waste acid, a dilute nickel chloride containing solution is formed, which is then concentrated by evaporation to a volume, which enables to adjust the required hydrochloric acid concentration by adding concentrated sulfuric acid to the solution in an amount equivalent to the dissolved nickel salt content. The pure hydrochloric acid solution is separated by distillation from the purified nickel salt containing solution.

A further advantage of the process of this invention is, that the anion exchange resin adsorbs also the contaminations present in the technical sulfuric acid added, accordingly in spite of using acids of technical quality, analytically pure products can be obtained.

Our invention is further elucidated by the aid of the examples. The examples are given for the purpose of illustration and not by way of limitation.

EXAMPLE 1

Nickel sulfide containing nickel concentrate is heated to 760° C. to improve its solubility in the acid. The metal content of the cooled mixture is the following:

| Ni | 58.00 % |
|---|---|
| Co | 7.35 % |
| Cu | 0.65 % |
| Zn | 1.95 % |
| Fe | 1.30 % |

In an autoclave 1.2 kg. of the above heat-treated nickel concentrate is dissolved with heating in 4.8 l. of 8.5 N HCl solution containing about 10 g./l. of nickel in the form of nickel sulfate. (This nickel sulfate containing hydrochloric acid solution is the wash of the anion-exchange resin column.) The obtained solution is filtered and the filter cake is washed with about 0.3 l. of water. The combined filtrate and wash (volume: 5.1 l.) contains 132 g./l. of nickel and 113 g./l. of HCl The Fe(II) ions present are oxidized by passing gaseous chlorine into the solution, then the solution is evaporated to a volume of 3.4 l. 613 ml. of technical sulfuric acid (concentration: 93 percent) are added to the thus-obtained solution, containing 198 g./l. of nickel and 162 g./l. of HCl and the obtained 4 l. solution is passed through an anion-exchange resin column from the bottom to the top, at a temperature of 40° to 50° C. The resin adsorbs the chlorocomplex anions of the metallic contaminations. The nickel salt content of the effluent corresponds to 168g./l. of pure nickel, and its hydrochloric acid concentration is 332 g./l.

The resin is washed with concentrated hydrochloric acid solution to remove nickel salt, dissolved in the wetting solution. The thus obtained wash, containing nickel sulfate corresponding to 10 g./l. of nickel, is used in the preceding step as starting solution.

Thereafter the metal ions adsorbed on the resin as their chlorocomplex anions are eluted with pure water, and the metal compounds are isolated from the obtained solution in a known way.

From the purified, nickel sulfate containing hydrochloric acid solution analytically pure concentrated hydrochloric acid can be distilled off.

The pasty residue is treated with purified water, and nickel sulfate heptahydrate is crystallized from the aqueous solution.

In the following table there are listed the analysis data of the nickel sulfate heptahydrate obtained according to the invention in comparison with the values prescribed in Hung. Standard No. 19846-67.

TABLE 2

| Metal | $NiSO_4 \cdot 7H_2O$ | | | |
| --- | --- | --- | --- | --- |
| | Prepared according to the invention | | Prescribed in Hung. Standard No. 19846-67 | |
| Ni | 21.59 % | min. | 20.0 % | |
| Co | 0.16 % | max. | 0.5 % | |
| Pb | 0.001 % | max. | 0.002 % | |
| Cu | 0.001 % | max. | 0.002 % | |
| Zn | 0.005 % | max. | 0.005 % | |
| Cd | 0.001 % | max. | 0.005 % | |
| Fe | 0.005 % | max. | 0.005 % | |
| As | 0.001 % | max. | 0.005 % | |
| Ca+Mg | 0.2 % | max. | 0.3 % | |

From the above data it appears that the nickel content of the product prepared according to the present invention is higher than the required, and the quantity of the contaminations is far less than the allowed value.

By variation and combination of an adequate number of ion-exchange resin columns the process according to the invention may be carried out continuously even on an industrial scale.

EXAMPLE 2

$NiCO_3$ of technical quality, dried at 110° C. contains 54 percent of nickel, and Co, Fe, Mn, Cu, Zn and Cd contaminations in a total quantity of 1 to 2 percent.

1 kg. of dry $NiCO_3$ is dissolved in 6 l. of 17 percent waste hydrochloric acid solution, and the mixture is filtered. The about 6 l. of filtrate contains 540 g. of nickel as its chloride and 410 g. of free HCl. The filtrate is evaporated to 2.7 l. The nickel content of the residue is 200g./l. About 50 g. of HCl escape with the about 3.3 l. of distillate, accordingly about 360 g. of free HCl remains in the residue. 530 ml. of 93 percent technical sulfuric acid are added to the above concentrated solution which liberates 670 g. of hydrochloric acid from $NiCl_2$. The total free hydrochloric acid content of the about 3.2 l. of solution is 1,030 g. The solution contains 169 g. of nickel and 332 g. of hydrochloric acid per liter. The purity grade of the product obtained from the purified solution corresponds to that indicated in Example 1.

What we claim is:

1. A process of separating nickel from metals forming chlorocomplex anions, comprising dissolving a nickel concentrate in hydrochloric acid to form a nickel chloride solution, boiling down the nickel chloride solution to a nickel content of not more than 240 grams per liter, increasing the concentration of hydrochloric acid to 7 to 9 moles/liter by adding concentrated sulfuric acid to the solution in an amount equivalent to the nickel present, thereby forming a nickel sulfate salt, adsorbing the metallic contaminations on an anion-exchange resin, and isolating hydrated nickel sulfate and hydrochloric acid from the effluent from the resin.

2. A process as claimed in claim 1, and preparing said nickel chloride solution by dissolving the nickel concentrate in a waste acid of technical quality containing not more than 20 percent of hydrochloric acid, and distilling off concentrated hydrochloric acid solution from the nickel-containing solution purified by ion exchange.

3. A process as claimed in claim 1, said content being not more than 200 grams per liter.

* * * * *